(12) United States Patent
Bhushan et al.

(10) Patent No.: US 12,711,875 B2
(45) Date of Patent: Aug. 18, 2026

(54) AUTOMATIC GENERATION OF STANDARD OPERATING PROCEDURES FROM MULTIMEDIA CONTENT

(71) Applicant: Squint, Inc., San Jose, CA (US)

(72) Inventors: Devin Bhushan, San Jose, CA (US); Dylan Patricia Conway, Denver, CO (US); Benjamin Scott Weaver, Mountain View, CA (US); Jim Zhu, Seattle, WA (US)

(73) Assignee: Squint, Inc., San Jose, CA (US)

( * ) Notice: Subject to any disclaimer, the term of this patent is extended or adjusted under 35 U.S.C. 154(b) by 0 days.

(21) Appl. No.: 18/673,087

(22) Filed: May 23, 2024

(65) Prior Publication Data

US 2024/0395163 A1 Nov. 28, 2024

Related U.S. Application Data

(60) Provisional application No. 63/504,280, filed on May 25, 2023.

(51) Int. Cl.

| | |
|---|---|
| ***G09B 7/02*** | (2006.01) |
| ***G06V 20/40*** | (2022.01) |
| ***G09B 7/00*** | (2006.01) |
| ***G10L 15/183*** | (2013.01) |
| ***G10L 25/57*** | (2013.01) |

(52) U.S. Cl.

CPC ............... *G09B 7/00* (2013.01); *G06V 20/40* (2022.01); *G10L 15/183* (2013.01); *G10L 25/57* (2013.01)

(58) Field of Classification Search

CPC ........... G09B 7/00; G09B 7/02; G09B 19/003

See application file for complete search history.

(56) References Cited

U.S. PATENT DOCUMENTS

| | | | | |
|---|---|---|---|---|
| 8,914,472 | B1 * | 12/2014 | Lee | G06Q 30/04 709/219 |
| 2011/0117529 | A1 * | 5/2011 | Barash | G09B 19/003 434/265 |
| 2013/0080891 | A1 * | 3/2013 | Byun | G06F 3/048 715/704 |
| 2017/0280188 | A1 * | 9/2017 | Mullins | H04N 21/4302 |
| 2021/0264810 | A1 * | 8/2021 | Johnson | G09B 9/00 |
| 2021/0271886 | A1 * | 9/2021 | Zheng | G06V 20/46 |
| 2022/0414992 | A1 * | 12/2022 | Ramani | G06T 19/006 |

* cited by examiner

*Primary Examiner* — Peter R Egloff

(74) *Attorney, Agent, or Firm* — Banner & Witcoff, Ltd.

(57) ABSTRACT

A procedure generation system obtains multimedia content describing performance of a task and generates a procedure including content for guiding a user through performance of the task. The procedure generation system extracts audio data from the multimedia content and generates a transcription of the audio data through application of a trained model. The transcription includes text corresponding to the audio data and timestamps associated with different text. Based on the transcription, a trained model generates a set of steps, with each step including text corresponding to different time intervals. The procedure generation system identifies portions of the multimedia content corresponding to different steps based on the time intervals and associates identified portions of the multimedia content with corresponding steps to generate the procedure. This generates a procedure with various steps including text and a corresponding portion of the multimedia content.

20 Claims, 9 Drawing Sheets

AUTOMATIC GENERATION OF STANDARD OPERATING PROCEDURES FROM MULTIMEDIA CONTENT

CROSS-REFERENCE TO RELATED APPLICATIONS

This application claims the benefit of U.S. Provisional Application No. 63/504,280 filed on May 25, 2023, which is incorporated by reference herein in its entirety.

BACKGROUND

Various organizations use standard operating procedures (SOPs) to help workers perform routine tasks in a manner aiming to achieve efficiency, quality control, and uniformity of performance. Conventionally, standard operating procedures are documented by an organization in user manuals or in instructional videos. Alternatively, standard operating procedures are conveyed by word of mouth among workers in an organization. Producing conventional standard operating procedure materials can be time- and labor-intensive. Further, errors included in standard operating procedure materials or difficulty following complex instructions in standard operating procedure materials may cause performance of procedures by workers to remain error prone.

DETAILED DESCRIPTION

Figure 1:
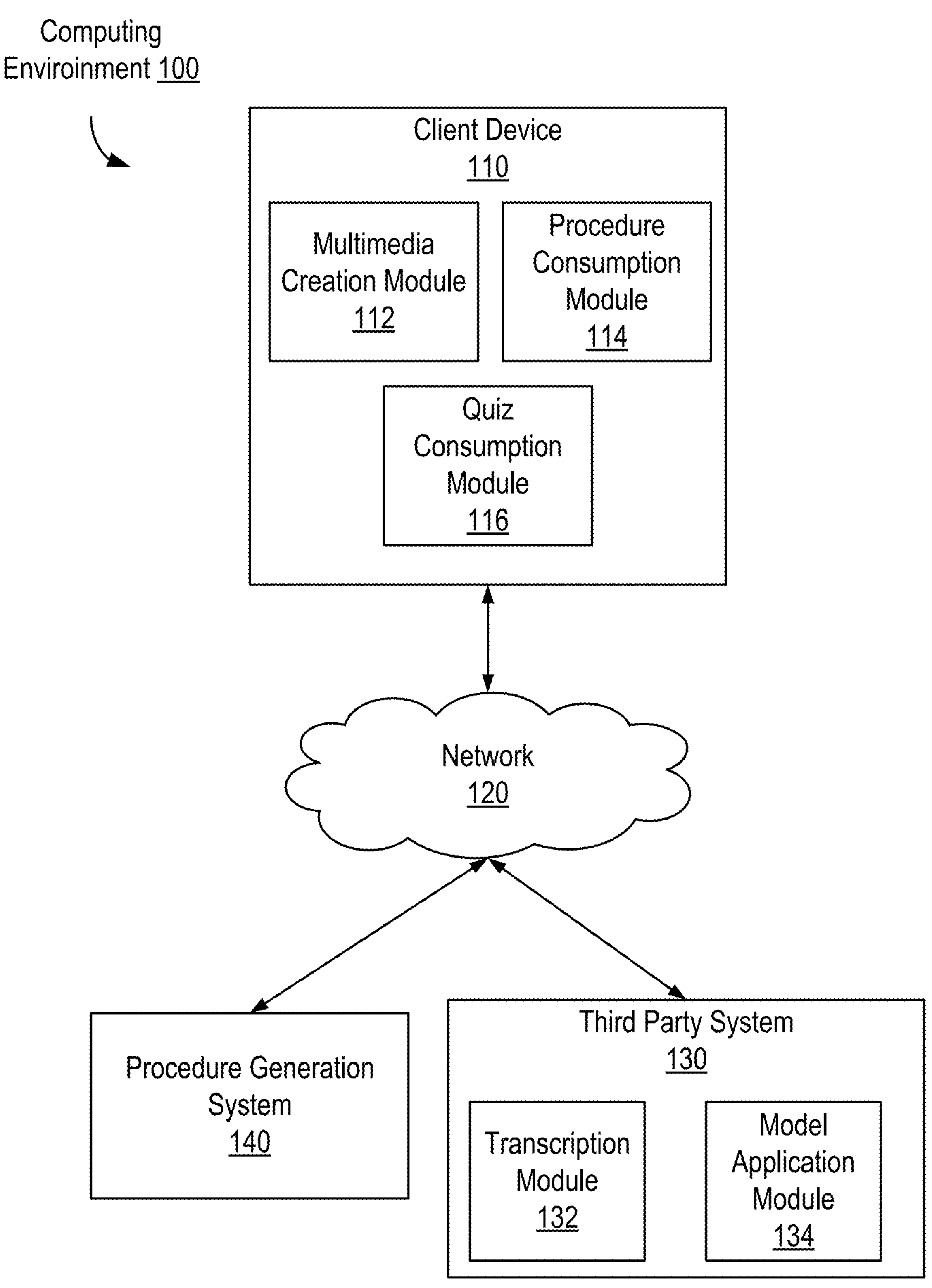
FIG. 1 is a block diagram of an example embodiment of a computing environment in which a procedure generation system operates.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. Wherever practicable, similar or like reference numbers may be used in the figures and may indicate similar or like functionality.

A procedure generation system leverages multimedia content of a task from a creating user to automatically generate procedures that include content for guiding a user through performance of the task. In various embodiments, the procedures comprise a sequence of steps corresponding to actions performed at different times during the task. Each step may describe or identify one or more actions performed in a local area for completing different aspects or portions of the task. Each step may include text data and a portion of the multimedia content corresponding to the text data in the step. For example, the procedure generation system generates interactive augmented reality (AR) based multimedia content guiding the user through performance of the task.

In various embodiments, the multimedia input comprises video data, which may include speech-based audio data, captured in a freeform manner by one or more client devices (e.g., mobile devices, wearable devices, standalone video camera, etc.). The procedure generation system obtains the multimedia content and extracts audio from the multimedia content. Based on the extracted audio, the procedure generation system obtains a transcription of the audio that includes text corresponding to different portions of audio and timestamps associated with various text (e.g., individual words, phrases, sentences, etc.). A trained model, such as a large language model (LLM), receives the transcription, along with a prompt in some embodiments, as input and generates a set of steps. Each step corresponds to a different time interval and includes text from the transcription having timestamps within a corresponding time interval. The set of steps are temporally ordered to describe performance of different actions for the task during different time intervals. Based on the set of steps, the procedure generation system identifies portions of video data in the multimedia content corresponding to time intervals of different steps of the set. The procedure generation system associates text data in a step with an identified portion of the video data corresponding to the step to generate the procedure. Hence, the procedure includes a combination of text data and segments of video data for different time intervals during performance of the task. Different steps describe performance of actions in a sequence to complete a task. The procedure generation system stores the resulting procedure with step comprising combinations of text and portions video data from multimedia content (or other portions of the multimedia content) corresponding to different time intervals for subsequent presentation to users.

FIG. 1 illustrates an example embodiment of a computing environment 100 in which a procedure generation system 140 operates to generate a procedure from multimedia content. The computing environment 100 includes one or more client devices 110, a network 120, one or more third party systems 130, and the procedure generation system 140. In different embodiments, the computing environment 100 may include different or additional components or include components that combine functionality of multiple components depicted in FIG. 1.

For purposes of illustration, FIG. 1 shows a single client device 110 in the computing environment 100. However, in various embodiments, the computing environment 100 may include any number of client devices 110. Different types of client devices 110 may be included in the computing environment 100. Examples of a client device 110 include a mobile phone, a tablet computer, a desktop computer, or other computing device. Additionally, one or more client devices 110 may include a head mounted display device, smart glasses, smart goggles, one or more smart contact lenses, or other devices capable of displaying or presenting augmented reality (AR) content. Other types of wearable devices may comprise a client device 110 in various embodiments. A client device 110 may furthermore include one or more input devices or output devices capable of receiving input (e.g., commands, data, other information) and presenting output content (e.g., video data, audio data, image data, etc.). Example input devices include a touch-sensitive device, a keyboard, or a pointing device. Example output devices include a display device, a speaker, or a haptic feedback device.

Additionally, a client device 110 includes one or more sensors in various embodiments. For example, a sensor comprises an inertial measurement unit (IMU). The IMU senses motion of the client device 110 using one or more motion sensing devices, such as an accelerometer or a gyroscope. Examples of motion data that may be directly obtained or derived from the IMU include: position, velocity, acceleration, orientation, angular velocity, angular acceleration, or other position and/or motion parameters. In some embodiments, the IMU may include various additional sensors such as a temperature sensor, magnetometer, or other sensors that may aid in calibrating or filtering the IMU data to improve accuracy of sensor data. In various embodiments, the client device 110 includes additional sensors, such as a location sensor (e.g., a global positioning system), audio sensor, a temperature sensor, humidity sensor, pressure sensors, or other sensors.

In various embodiments, a client device 110 includes a multimedia creation module 112, a procedure consumption module 114, and a quiz consumption module 116. However, a client device 110 may include different or additional components in some embodiments. Further, in various embodiments, a client device 110 may include fewer components than those shown in FIG. 1.

The multimedia creation module 112 comprises one or more cameras or video capture devices, one or more microphones or other audio capture devices, and supporting processing and/or storage elements for creating multimedia. For example, the multimedia creation module 112 includes one or more cameras and microphones integrated with a client device 110 or coupled to the client device 110. Additionally, the multimedia creation module 112 comprises one or more interfaces or applications that receive an input from a user of the client device 110, such as a creating user, to start or to stop capture of multimedia content of a local area surrounding the client device 110. For example, in response to receiving an input via an interface, the multimedia creation module 112 initiates capture and storage of video data or image data of a local area within a field of view of a camera, as well as of audio data occurring within the local area. Similarly, in response to receiving an alternative input, the multimedia creation module 112 ceases capturing video data, image data, or audio data of the local area. The multimedia creation module 112 may capture specific types of data from the local area without capturing other types of data from the local area in various embodiments. For example, the multimedia creation module 112 may capture video data of the local area without capturing audio data, or vice versa. Different inputs received by an interface may affect capture of different types of data by the multimedia creation module 112, allowing the creating user to identify specific data captured from the local area. The multimedia creation module 112 stores captured multimedia data of the local area in a storage device of the client device 110 in various embodiments. Further, the multimedia creation module 112 may retrieve data stored in the storage device of the client device 110 in various embodiments. For example, the multimedia creation module 112 retrieves multimedia content, such as image data, video data, text data, audio data, documents, spatial information, or other types of data from a storage device of the client device 110.

Multimedia captured or retrieved by the multimedia creation module 112 may include various metadata. Example metadata includes: an identifier of a procedure, an identifier of a creating user of the procedure, an identifier of an organization or entity associated with the procedure, one or more use cases of the procedure, temporal information identifying when the multimedia content was captured, or other information describing the metadata. Further, the multimedia creation module 112 processes captured or retrieved multimedia content in various embodiments. For example, the multimedia creation module 112 standardizes a format of the multimedia content, standardizes encoding parameters of the multimedia content, or modifies one or more other parameters of the multimedia content. Such processing may be performed prior to storing the multimedia content in a persistent storage device or may be performed prior to transmitting the multimedia content to a third-party system 130 or to the procedure generation system 140 in various embodiments.

The procedure consumption module 114 comprises an application executing on the client device 110 for accessing, viewing, creating, and/or editing procedures. For example, in response to an input to view a procedure, the procedure consumption module 114 retrieves a procedure identified by an input from the procedure generation module 140 and presents the retrieved procedure to the user through one or more output devices (e.g., display devices, speakers, etc.) of the client device 110. Additionally, to create a new procedure, the procedure consumption module 114 receives a procedure generation input from a creating user of the client device 110. In response to receiving the procedure generation input, the procedure consumption module 114 presents one or more options to the creating user to provide multimedia content to the procedure generation system 140 for generating a procedure based on the multimedia content. For example, the procedure consumption module 114 presents an option to capture multimedia content via the client device 110 or to retrieve previously captured multimedia content stored on the client device 110 or stored on another device (e.g., an additional client device 110, a third-party system 130, the procedure creation system 140, etc.). Further, the procedure consumption module 114 may receive an editing input from the creating user and identify one or more procedures previously generated by the procedure generation system 140. In response to receiving a selection of a previously generated procedure, the procedure consumption module 114 provides one or more interfaces to the creating user for obtaining multimedia content through capture by the multimedia creation module 112 or for retrieval from a storage device. The procedure consumption module 114 transmits the obtained multimedia content and an identifier of the previously generated procedure to the procedure generation system 140 for adding one or more steps to the previously generated procedure or for modifying one or more steps of the previously generated procedure. Example interfaces generated and presented by the procedure consumption module 114 are further described below in conjunction with FIGS. 5-9.

The quiz consumption module 116 comprises an application for accessing, viewing, creating, and/or editing quizzes associated with procedures that may be employed for training and/or testing purposes. In various embodiments, the quiz consumption module 116 receives a quiz generation input from a creating user of the client device 110 to generate a quiz for a procedure. The quiz includes one or more questions based on steps in the procedure. Questions comprising the quiz are presented to a user, and answers to the questions received from the user assess the user's understanding of content in the procedure, such as content of steps in the procedure. In response to receiving a quiz generation input and a selection of a procedure, the quiz consumption module 116 transmits a quiz generation request to the procedure generation system 140 that identifies the procedure. The procedure generation system 140 generates a quiz for the selected procedure in response to receiving the quiz generation request, as further described below in conjunction with FIG. 4.

Additionally, the quiz consumption module 116 obtains a quiz for a procedure identified by a user via an input. In some embodiments, the quiz consumption module 116 automatically obtains a quiz for a procedure from the procedure generation system 140 in response to determining a user completed viewing a final step of the procedure. Alternatively, or additionally, the quiz consumption module 116 obtains the quiz for the procedure in response to receiving a request for the quiz from the user. The quiz consumption module 116 presents questions comprising an obtained quiz to the user via one or more display devices of a client device 110 (e.g., a display device, a speaker, etc.), receives answers to the questions of the quiz from the user, and transmits results of the quiz in association with an identifier of the user to the procedure generation system 140. In some embodiments, a single module provides the functionality of the procedure consumption module 114 and of the quiz consumption module 116.

The network 120 comprises communication pathways for communication between one or more client devices 110, one or more third party systems 130, and the procedure generation system 140. The network 120 may include one or more local area networks and/or one or more wide area networks (including the Internet). The network 120 may also include one or more direct wired or wireless connections (e.g., Ethernet, WiFi, cellular protocols, WiFi direct, Bluetooth, Universal Serial Bus (USB), or other communication link).

In various embodiments, the computing environment 100 includes one or more third party systems 130. A third-party system 130 is external to the procedure generation system 140. For example, a third-party system 130 has a different domain than the procedure generation system 140. While FIG. 1 shows an example including a single third-party system 130, in other embodiments, the computing environment 100 includes different numbers of third-party systems 130.

The third-party system 130 shown in FIG. 1 includes a transcription module 132 and a model application module 134. In different embodiments, the third-party system 130 includes different or additional modules. Further, in some embodiments, the third-party system 130 may combine functionality of the transcription module 132 and of the model application module 134 into a single module.

The transcription module 132 receives audio data as input and generates a transcription of the audio data including text generated from the audio data and timing data, such as timestamps, corresponding to different portions of the text. Hence, the transcription provides a textual representation of the audio data that identifies times when speech corresponding to the text is present in the audio data. The transcription module 132 may apply one or more speech-to-text models to the audio data to generate text corresponding to the audio data Additionally, the transcription module 132 associates timestamps with different portions of the text, with a timestamp associated with a portion of text indicating a time in the audio data when audio corresponding to the text was detected. For example, the transcription module 132 associates a timestamp with each individual word detected in the audio data. Alternatively, the transcription module 132 associates a timestamp with different phrases, sentences, paragraphs, or other portions of text generated from the audio input. The transcription module 132 may determine a size of a portion of text associated with a timestamp based on a number of words detected in the audio data or based on a type of model applied to the audio data. The transcription generated by the transcription module 132 comprises structured data, such as text data having JAVASCRIPT® Object Notation (JSON) format or another format representing structured data. In some embodiments, the transcription module 132 performs post-processing or formatting of a generated transcription so a format of the transcription generated from the audio input is suitable or optimized for the procedure generation system 140, further described below. Alternatively, the procedure generation system 140 processes or formats a transcription generated by the transcription module 132.

The model application module 134 applies a trained model to a received input comprising unstructured text (e.g., as derived from the audio transcription) to generate an output comprising structured text in the form of a procedure. In various embodiments, the model comprises a trained generative model, such as a trained large language model (LLM), that receives an input prompt and generates an output based on the input prompt. For example, the LLM receives an input prompt including a transcription generated by the transcription module 132 and one or more formatting instructions. The input prompt is structured to prompt the LLM to process the unstructured content of the transcription into a set of ordered steps having a specified structured format. In various embodiments, the one or more formatting instructions included in the prompt specify conversion of the transcription, which includes timestamps with different portions of the text, to a set of steps. Alternatively, the LLM receives unstructured text content comprising a transcription of audio data that does not include timestamps for different portions of the text content in a prompt with formatting instruction; based on the prompt and the transcription, the LLM (or other generative model) generates a set of steps having a specific structured format based on the formatting instructions. Examples of formatting instructions may include instructions identifying a format of the transcription, identifying a language for the steps, identifying characteristics of text to remove from the transcription when generating a step, describing how to combine text in a step, identifying timing information to include in a step, or describing conversion of the transcription to the set of steps. Each step generated by the LLM corresponds to a different time interval, with text included in a step associated with timestamps within a time interval associated with the step. The steps have a temporal sequence, so earlier steps in the sequence correspond to earlier time intervals in the transcription. Including particular information in the prompt or having a particular structure to the input prompt allows the LLM or other generative model, to generate consistent, repeatable, formatted output for use by the procedure generation module 140, as further described below.

In some embodiments, the model application module 134 tunes a generative model, such as an LLM, for generating a set of steps having a structured format based on unstructured text received as input. The model application module 134 may tune a generative model previously pretrained through application to a large text corpus to generate a set of steps having the structured format by applying the generative model to examples that each include unstructured text and a corresponding set of steps having the structured format. In various embodiments, each example includes unstructured text, such as a transcription of audio data (which may include timestamps for different portions of text or may not include timestamps for different portions of text) and a set of steps in a structured format based on the unstructured text. One or more of the examples may be sets of steps previously generated by the model application module 134 or previously stored by the procedure generation module 140.

The model application module 134 may tune the generative model using an index generated from the examples. To generate the index, the model application module 134 generates an embedding for each example and stores each embedding in the index in association with a corresponding example. In various embodiments, an embedding for an example is based on a combination of the unstructured text included in the example and the corresponding set of steps in the structured format in the example. Different examples correspond to different sets of steps having the structured format in various embodiments.

To tune the generative model, the model application module 134 generates an embedding for a transcription, or for other unstructured text data. Based on the embedding for the transcription and embeddings for different examples in the index, the model application module 134 selects one or more examples. For example, the model application module 134 determines measures of similarity (e.g., dot product, cosine similarity) between the embedding for the transcription and each embedding for an example in the index. The model application module 134 selects one or more embeddings from the index based on the measures of similarity. For example, the model application module 134 selects one or more examples having at least a threshold measure of similarity. As another example, the model application module 134 ranks examples of the index based on their measures of similarity and selects one or more examples having at least a threshold position in the ranking. The model application module 134 generates a prompt that includes formatting instructions, the transcription, and the selected one or more examples (or embeddings for the selected one or more examples). Including the selected one or more examples (or embeddings for the selected one or more examples) in the prompt allows the generative model to leverage information about a transcription in an example and a set of steps for the example when generating the set of steps in the structured format for the transcription.

The procedure generation system 140 may be implemented as one or more traditional physical servers and/or one or more virtual machines. The procedure generation system 140 may comprise one or more on-site processing and/or storage devices coupled to one or more client devices 110 via a private network, or may comprise cloud processing and storage technologies, or a combination thereof. For example, in a cloud-based implementation, the procedure generation system 140 may include multiple distributed computing and storage devices managed by a cloud service provider. The procedure generation system 140 may include an aggregation of multiple servers responsible for different functions and may include various physical and/or virtual servers managed and/or operated by different entities. In various implementations, the procedure generation system 140 may comprise one or more processors and one or more non-transitory computer-readable storage mediums that store instructions executable by the one or more processors for carrying out the functions attributed to the procedure generation system 140 herein.

The procedure generation system 140 generates a procedure based on a set of steps generated from a transcription. The procedure includes a set of steps each corresponding to a different time interval, with each step describing one or more actions to perform in a local area for completing or for performing a task associated with the procedure. Hence, the procedure describes a sequence of actions to be performed at different times for a user to perform the task. As further described above, the transcription includes text data and timestamps for different text generated from multimedia content. As further described below, the procedure generation system 140 obtains a set of steps generated from the transcription and multimedia content corresponding to the transcription, such as the multimedia content from which the transcription was generated. The procedure generation system 140 augments one or more steps of the set with a portion of the multimedia content corresponding to a step. For example, the procedure generation system 140 augments each step of the set with a corresponding portion of the multimedia content. A portion of the multimedia content augmenting a step is less than the complete multimedia content that comprises a limited amount of the multimedia content occurring during a time interval corresponding to the step. In various embodiments, for a step of the set, the procedure generation system 140 identifies a portion of the multimedia content corresponding to timestamps or to other timing information included in the step and extracts the identified portion of the multimedia content. The procedure generation system 140 augments the step with the corresponding identified portion of the multimedia content, generating a procedure including the set of steps with corresponding portions of the multimedia content included in conjunction with various steps. The procedure generation system 140 stores the generated procedure for subsequent retrieval and presentation to one or more users via one or more client devices 110. The procedure generation system 140 is further described below in conjunction with FIG. 2.

Figure 2:
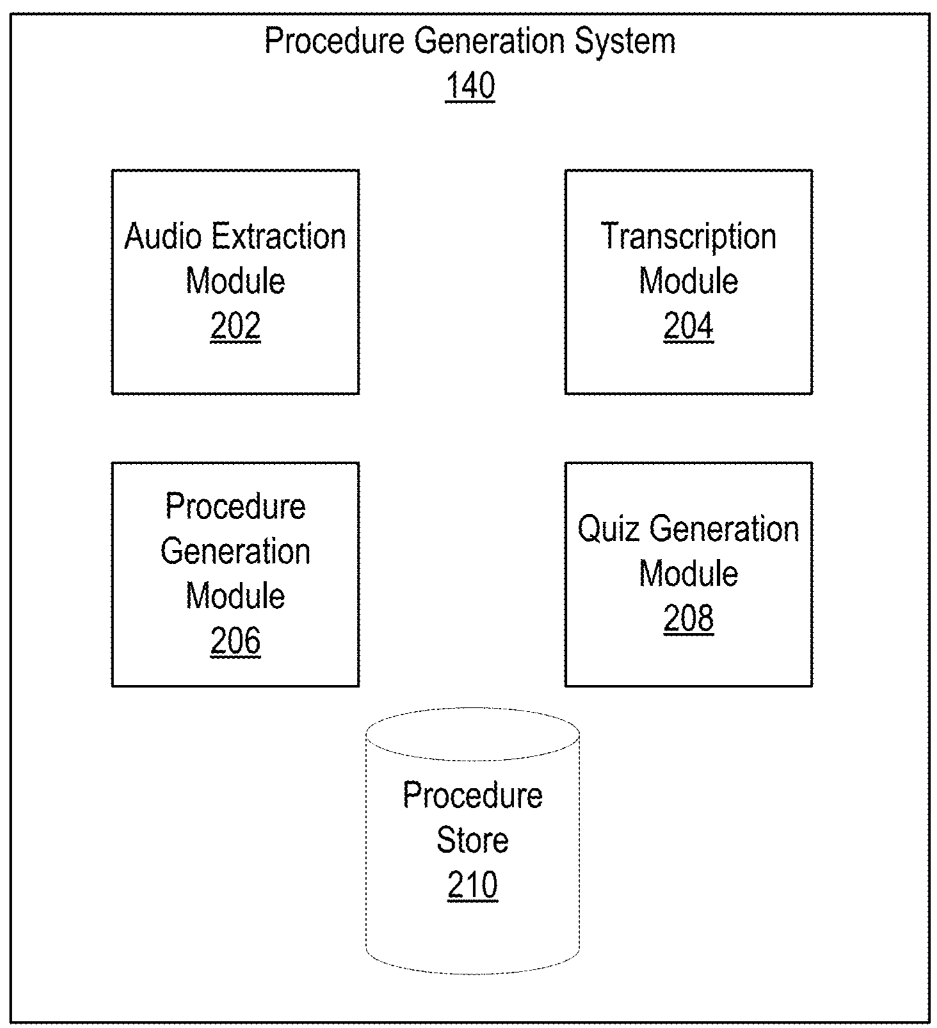
FIG. 2 is a block diagram of an example embodiment of a procedure generation system.

FIG. 2 is a block diagram of an example embodiment of a procedure generation system 140. In the example shown by FIG. 2, the procedure generation system 140 includes an audio extraction module 202, a transcription module 204, a procedure generation module 206, a quiz generation module 208, a document processing module 210, and a procedure store 212. However, in various embodiments, the procedure generation system 140 includes different or additional components than those described in conjunction with FIG. 2. Further, in various embodiments, the procedure generation module 140 may include fewer modules than those depicted in FIG. 2, with functionality described in FIG. 2 performed by different modules combined into a single module.

The audio extraction module 202 obtains multimedia content and extracts audio data from the multimedia content. In various embodiments, the audio extraction module 202 receives multimedia content captured by a multimedia creation module 112 of a client device 110, while in other embodiments the audio extraction module 202 retrieves multimedia content previously stored by the procedure generation module 140 (e.g., in the procedure store 212). The audio extraction module 202 may obtain multimedia content from a third-party system 130 in various embodiments. For example, multimedia content comprises video data of a local area that includes audio data, and the audio extraction module 202 extracts the audio data from the video data. In various embodiments, the audio extraction module 202 generates an audio file including audio data extracted from multimedia content. The extracted audio data may be associated with multimedia content from which the audio data was extracted in various embodiments, simplifying correlation of audio data with multimedia content.

The transcription module 204 receives audio data, such as from the audio extraction module 202, and transmits the audio data to a third-party system 130 including a transcription module 132. The transcription module 204 of the procedure generation system 140 transmits the audio data along with identifying information to the third-party system 130, where the transcription module 132 generates a transcription of the audio data, as further described above in conjunction with FIG. 1. Subsequently, the transcription module 204 receives a transcription of the audio data from the third party system 130 and associates the transcription of the audio data from the third party system 130 with corresponding multimedia content. The transcription module 204 may process, format, or otherwise modify the received transcription. For example, the transcription module 204 removes certain portions of text from a received transcription, reducing a number of words in the transcription.

Alternatively, the transcription module 204 receives audio data, such as from the audio extraction module 202, and generates a transcription of the audio data. The transcription includes text corresponding to different portions of the audio data with timing data, such as timestamps, corresponding to different portions of the audio data, similar to the transcription module 132 of the third-party system 130 further described above in conjunction with FIG. 1. For example, the transcription module 204 generates a transcription comprising text representing speech in the audio input. The transcription module 204 associates timestamps, or other timing information, with different portions of the text. For example, the transcription module 204 associates a timestamp with each word detected in the audio input. Alternatively, the transcription module 204 associates a timestamp with different phrases, sentences, paragraphs, or other discrete portions of text detected in the audio data. In some embodiments, the transcription module 204 performs post-processing or formatting of a generated transcription. For example, the transcription module 204 removes certain words, phrases, or other portions of text to reduce a size of the transcription without impairing the subject matter of the transcription.

In various embodiments, the procedure generation module 206 receives a transcription from the transcription module 204. The transcription may be locally generated by the transcription module 204 in some embodiments. Alternatively, the transcription module 204 receives the transcription from a third-party system and provides the transcription to the procedure generation module 206. The procedure generation module 206 generates a prompt that includes formatting instructions and the transcription, as well as information identifying corresponding multimedia content for the prompt. The procedure generation module 206 transmits the prompt and identifying information to a third-party system 130 with a model application module 134. In some embodiments, the procedure generation module 206 may process, format, or otherwise modify the received transcription. For example, the procedure generation module 206 removes certain portions of text from a received transcription, reducing a number of words in the transcription.

In various embodiments, the prompt generated by the procedure generation module 206 includes a transcription and multiple formatting instructions. For example, the formatting instructions specify that the output of the generative model (e.g., LLM) is a set of steps in an ordered sequence, and may identify information included in different steps, such as a starting timestamp for a step and an ending timestamp for the step. Additionally, in some embodiments, the formatting instructions identify characteristics of text to remove from the transcription when generating the set of steps. For example, formatting instructions specify removal of filler words, non-instructional words, or words that are introductory or concluding remarks. One or more formatting instructions may also specify a language of the set of steps (e.g., indicating the set of steps are in the language of the transcript, indicating a specific language for the set of steps, etc.) or may indicate how to combine portions of text in the transcription in one or more steps (e.g., combining portions of text that are in a common step of the set of steps). As an example, the prompt includes the transcription and formatting instructions to omit words from the transcription satisfying certain criteria in the set of steps, to combine portions of text in a common step if appropriate, to generate steps in a particular language (e.g., the language of the transcription), and to include a starting timestamp and an ending timestamp for each step. The prompt may be in natural language in various embodiments. In different embodiments, different or additional formatting instructions are included in the prompt to be used by the generative model in conjunction with the transcription to generate the set of steps.

As further described above in conjunction with FIG. 1, the model application module 134 generates a set of steps having a structured format from the transcription. In various embodiments, the set of steps comprises a file including text data having a structured format or a structured hierarchy. For example, the set of steps comprises a computer file including text data in a structured format or comprises a specific data structure organizing different steps into a hierarchy or other structure. For example, the set of steps comprises a file including text data formatted using JAVASCRIPT® Object Notation (JSON). In an example, the set of steps comprises a file having multiple fields, with each field including corresponding text data from the transcription. For example, the set of steps includes a field for a title that includes text data describing the set of steps and has a field for each step. The field for a step may include multiple sub-fields, such as a sub-field for an identifier of the step, a sub-field for text data comprising the step extracted from the transcription, a sub-field for a starting timestamp of the step, and a sub-field for an ending timestamp of the step. In other embodiments, a file comprising the set of steps may include different, additional, or alternative fields than those examples provided above. Further, in some embodiments, the set of steps has an alternative data structure for different components of one or more steps, with the structure of the data comprising the set of steps simplifying subsequent retrieval of different portions of steps.

The procedure generation module 206 receives the set of steps that a third-party system 130 generated from a transcription in various embodiments. For example, the procedure generation module 206 receives a set of steps that the third-party system 130 generated through application of one or more models to a transcription generated by a transcription module 132 of the third-party system 130, as further described above in conjunction with FIG. 1. Each step includes text data and timestamps corresponding to the text data (e.g., a timestamp of a first portion of text data in the step and a timestamp of a final portion of text data in the step, a relative position of text data in the step to text data in one or more additional steps). Based on the set of steps and the multimedia content from which the transcription was generated, the procedure generation module 206 identifies portions of the multimedia content corresponding to each step of the set. For example, the procedure generation module 206 synchronizes the multimedia content with the set of steps and identifies a portion of the multimedia content corresponding to timestamps included in each of one or more steps of the set. In some embodiments, the procedure generation module 206 identifies and extracts a portion (e.g., a clip) of the multimedia content for each step of the set. The portion of multimedia content identified for a step is less than the complete multimedia content and includes multimedia content occurring during a time interval corresponding to the step. The procedure generation module 206 extracts the identified portion of the multimedia content for a step from the multimedia content and associates the identified portion of the multimedia content with the step to generate a procedure. Hence, the procedure associates text data identified by the transcription for a step with a corresponding portion of the multimedia content identified for the step, so steps of the procedure include both text data and complementary portions of the multimedia content. This allows the procedure to provide both textual information for various steps and portions of the multimedia content relevant to different steps, providing a user with different types of content for understanding various steps.

Alternatively, the procedure generation module 206 receives a transcription generated by the transcription module 204 of the procedure generation module 140 and generates a set of steps based on the transcription. Each step includes text data and timestamps or other timing information about the text data in the step, as further described above. As further described above, the procedure generation module 206 generates a procedure by identifying portions of multimedia content from which the transcription was generated corresponding to time intervals of different steps and extracting the identified portions of the multimedia content. In such embodiments, the procedure generation module 206, rather than a third-party system 130, generates the set of steps from the transcriptions to identify different portions of text occurring at different time intervals and identifies portions of the multimedia content corresponding to different steps from the multimedia content from which the transcription was generated. Such embodiments allow the procedure generation system 140 to locally generate the transcription, the set of steps from the transcription, and the procedure from the set of steps.

When the transcription was generated from multimedia content including text data and image data, the procedure generation module 206 similarly generates a procedure by applying one or more models to the transcription. Application of the one or more models generates a set of steps where each step identifies different portions of text occurring different spatial position ranges. For example, an initial step includes a portion of text data identified as occurring earliest in the multimedia content, while a subsequent step includes an additional portion of text data identified as occurring subsequent to the portion of text data identified as occurring earliest in the multimedia content. In some embodiments, the procedure generation module 206 selects an alternative type of data, such as image data, audio data, or video data, corresponding to each step and associates text data in a step with the selected alternative type of data. For example, the procedure generation module 206 selects image data having a spatial position in the multimedia content nearest to spatial position of text data in a step for the step and associates the selected image data with the text data in the step. This allows the procedure to complement text data in one or more steps with another type of data to enhance user understanding of various steps by complementing text data with another type of data.

In some embodiments, the procedure generation module 206 receives one or more inputs from a creating user of a procedure that "pins" one or more steps of a procedure to one or more specific points in an environment map of a local area in which the procedure is performed. The environment map of the local area is a three-dimensional representation of the local area in which the procedure is performed. Pinning a step of the procedure to a point in the environment map fixes a virtual object for the step to the point. This causes display of the virtual object for the step to be limited to a client device 110 being within a threshold distance of a location in the local area corresponding to the point or to an image capture device of the client device 110 having a field of view including the location in the local area corresponding to the point. For example, the environment map includes equipment or other objects in the local area in which the procedure is performed, as well as information describing spatial positioning of the equipment or other objects in the local area. In various embodiments, the procedure generation module 206 receives a selection of a step of the procedure from a creating user and receives a selection of a corresponding point in the environment map of the local area for the step from the creating user. The procedure generation module 206 stores an association between the selected step and the selected corresponding point in the environment map in association with the procedure. Subsequently, a client device 110 may obtain the environment map based on data received from a client device 110 and display a virtual object corresponding to a step based on position information of the client device 110 or based on information within a field of view of a camera of the client device. For example, the client device 110 displays a virtual object corresponding to a step in response to determining a position in the local area from one or more sensors in the client device 110 is within a threshold distance of a point in the environment map to which the step is pinned. As another example, the client device 110 displays a virtual object via a display device corresponding to a step in response to determining a match between features in a field of view of a camera of the client and features in the environment map of a point to which the step is pinned. In response to receiving a selection of the virtual object, content comprising the step corresponding to the virtual object is displayed by the display device of the client device 110. This allows the procedure to have a corresponding artificial reality (AR) representation where different steps correspond to points in an environment map of the local area and virtual objects corresponding to steps are displayed as a user's client device 110 is near different points corresponding to different steps.

Presenting an AR representation of the procedure based on associations between steps and points in the environment map allows a client device to identify steps in the procedure to a user based on a position of the client device 110 of a user in the local area where the procedure is performed through virtual objects presented to the user. Different virtual objects may be presented at points corresponding to different steps in some embodiments, such as a number presented at a point in the environment map corresponding to a step pinned to the point. For example, each virtual object corresponds to a step in the procedure and includes multimedia content (e.g., text data, video data, audio data, image data, etc.) included in the step. In various embodiments, when the client device of the user captures video data or image data including the point in the environment map where a step of the procedure is pinned, a representation of the step is displayed by the client device. For example, when the user views a virtual object at a point in the local area to which a step is pinned, text data, video data, audio data, image data, or any combination thereof comprising the step is displayed as a virtual object via the client device 110. As another example, when one or more sensors of the client device 110 determines a position of the client device 110 in the local area is within a threshold distance of a point in the environment map to which a step is pinned, the client device 110 presents content from the step to the user. This allows a user to review different steps of the procedure by navigating through the local area where the procedure is performed through an AR representation of the procedure, providing the user with increased spatial mapping between different steps in the procedure to different locations in the local area where the procedure is performed.

In various embodiments, the procedure generation module 206 also allows a creating user, or another user, to modify a previously generated procedure included in the procedure store 212. The procedure generation module 206 receives an editing request from the creating user or from another user that identifies a stored procedure and identifies multimedia content (e.g., includes multimedia content captured by a client device 110, includes an identifier of stored multimedia content). In various embodiments, the stored procedure is associated with one or more permissions that identify users authorized to modify the procedure, allowing modification of the procedure to be limited to certain users. In response to receiving the editing request from a user authorized to modify the procedure by one or more permissions, the procedure generation module 206 applies one or more trained models to the identified procedure and to the identified multimedia content. Alternatively, the procedure generation module 206 applies one or more trained models to the identified multimedia content, without receiving the identified procedure as input. A trained model may generate a transcription of the identified multimedia content in the editing request, as further described above. Based on the transcription for the identified multimedia content and the identified procedure, the trained model, or an additional trained model, generates one or more additional steps for the procedure. In various embodiments, a trained model is a generative model, such as a large language model (LLM), that receives as input a prompt including the identified procedure, the transcript of the identified multimedia content, as well as formatting instructions and generates one or more additional steps for the identified procedure from the identified multimedia content. The trained model generates the one or more additional steps, as further described above regarding generation of steps for the procedure. Formatting instructions for modifying an identified procedure may at least partially differ from formatting instructions for generating a procedure from a transcription. For example, one or more formatting instructions for modifying the identified procedure indicate whether the additional steps are to be appended after a final step of the procedure or indicate a step after which (or before) the one or more additional steps are positioned. Formatting instructions may additionally identify: a format of the transcription of the identified multimedia content, a language for the additional steps, characteristics of text to remove from the transcription of the identified multimedia content when generating a step, combination of text in an additional step, timing information to include in an additional step, or other information describing conversion of the transcription to one or more additional steps. As further described above, the procedure generation module 206 identifies a portion of the identified multimedia content corresponding to one or more of the identified steps and includes an identified portion of the identified multimedia content with an additional step. This allows the procedure generation module 206 to modify an existing procedure with additional steps based on additionally captured or identified multimedia content, allowing a procedure to be refined or modified after initial generation.

Further, the procedure generation module 206 may generate a title or a description for a procedure by applying a trained model to steps comprising the procedure. In some embodiments, the procedure generation module 206 leverages a description generation model specifically trained to generate a title or a description for a procedure. Alternatively, the model used to generate the set of steps receives a description generation prompt including a procedure and one or more description formatting instructions. One or more description formatting instructions indicate whether the model generates a title or a description of the procedure, indicate a language for the title or for the description, or indicate other characteristic about presentation of the title or the description. The procedure generation module 206 may automatically generate the title or the description of a procedure after generating the procedure or may generate the title or the description of the procedure after receiving a description generation request that identifies the procedure in various embodiments.

The quiz generation module 208 generates a quiz based on a procedure stored or obtained by the procedure generation system 140. In various embodiments, the quiz generation module 208 receives a quiz generation request to generate a quiz and an identifier of a procedure. Alternatively, the quiz generation module 208 automatically generates a quiz after generating and storing a procedure. To generate a quiz, the quiz generation module 208 applies one or more trained quiz generation models to the procedure. Alternatively, the quiz generation module 208 applies one or more trained quiz generation models to the transcription from which the procedure was generated. A quiz generation model generates one or more questions based on content included one or more steps of the procedure, simplifying evaluation of a user's understanding of content comprising a procedure. In various embodiments, the quiz generation model is a trained generative model, such as a large language model (LLM), that receives an input prompt comprising one or more formatting instructions and the procedure. One or more formatting instructions may specify a format of questions included in the quiz (e.g., multiple choice, true-false, short answer, fill-in-the-blank, etc.), a number of questions included in the quiz, or other information specifying attributes or characteristics of content presented or included in the quiz. In some embodiments, a common model is used to generate the set of steps in the procedure and the quiz, with the model receiving a prompt for generating the model and an alternative prompt for generating the quiz. The prompt and the alternative prompt include different formatting instructions to cause generation of the set of steps and the quiz, allowing the procedure generation system 140 to leverage a single model to generate the set of steps for a procedure and the quiz for the procedure. The quiz generation module 208 stores the quiz in the procedure store 212 in association with the procedure, simplifying subsequent retrieval of the quiz based on the procedure. Subsequently, the procedure generation system 140 may transmit the quiz to a client device 110 for presentation to a user and receive results of the quiz for a user from the client device 110.

In some embodiments, the procedure generation system 140 includes a document processing module 210 configured to receive an alternative type of data and generates a transcription of the alternative type of data. For example, the document processing module 210 receives multimedia content including text data and image data, such as one or more documents (e.g., a pdf or a document from a word processing application) including text data and image data. The document processing module 210 applies one or more computer vision models to a document to determine relative spatial positioning of text to other text or images in a document and to determine relative spatial positioning of an image in the document to other text or other images in the document. Additionally, the document processing module 210 may apply one or more models that extract different image data from a document. Based on the relative spatial positioning of text or images in a document to other text or images in a document, the document processing module 210 generates a transcription including spatial positional information with different portions of text or images based on spatial positioning of portions of text or images to each other in the multimedia content. For example, the transcription associates spatial positioning information for different portions of text or for different images relative to a reference point in the multimedia content (e.g., a first portion of text in the multimedia content, a last portion of text in the multimedia content) or associates spatial positioning information with different portions of text or images based on spatial positioning of the portions of the text or the images relative to other portions of text or images in the multimedia content. This allows the document processing module 210 to generate a transcription of documents including text data and image data that both identifies different portions of text data or image data and provides ordering information for different portions of text data or image date based on their spatial positions in the multimedia content. In various embodiments, the procedure generation system 140 does not include the document processing module 210.

The procedure store 212 comprises a storage device configured to store procedures generated by the procedure generation module 206. For example, the procedure store 212 is a non-volatile storage device that maintains one or more databases, with each database including a procedure, and may include metadata associated with the procedure. Example metadata for a procedure includes: an identifier of a creating user who created the procedure, one or more permissions identifying users authorized to modify the procedure, an organization associated with the procedure, a date when the procedure was generated, a geographic location associated with the procedure, identifiers of users authorized to access the procedure, or other information describing the procedure. In some embodiments, the procedure store 212 maintains separate databases for different organizations and stores procedures generated for an organization in a database corresponding to the organization.

Additionally, in various embodiments, the procedure store 212 also maintains multimedia content received from a client device 110 or from a third party system 130. For example, the procedure store 212 stores multimedia content from a client device 110. Multimedia content stored in the procedure store 212 may be associated with a procedure generated from the multimedia content in some embodiments. Multimedia content may alternatively or additionally be stored in the procedure store 212 rather than by a client device 110 that captured the multimedia content.

Figure 3:
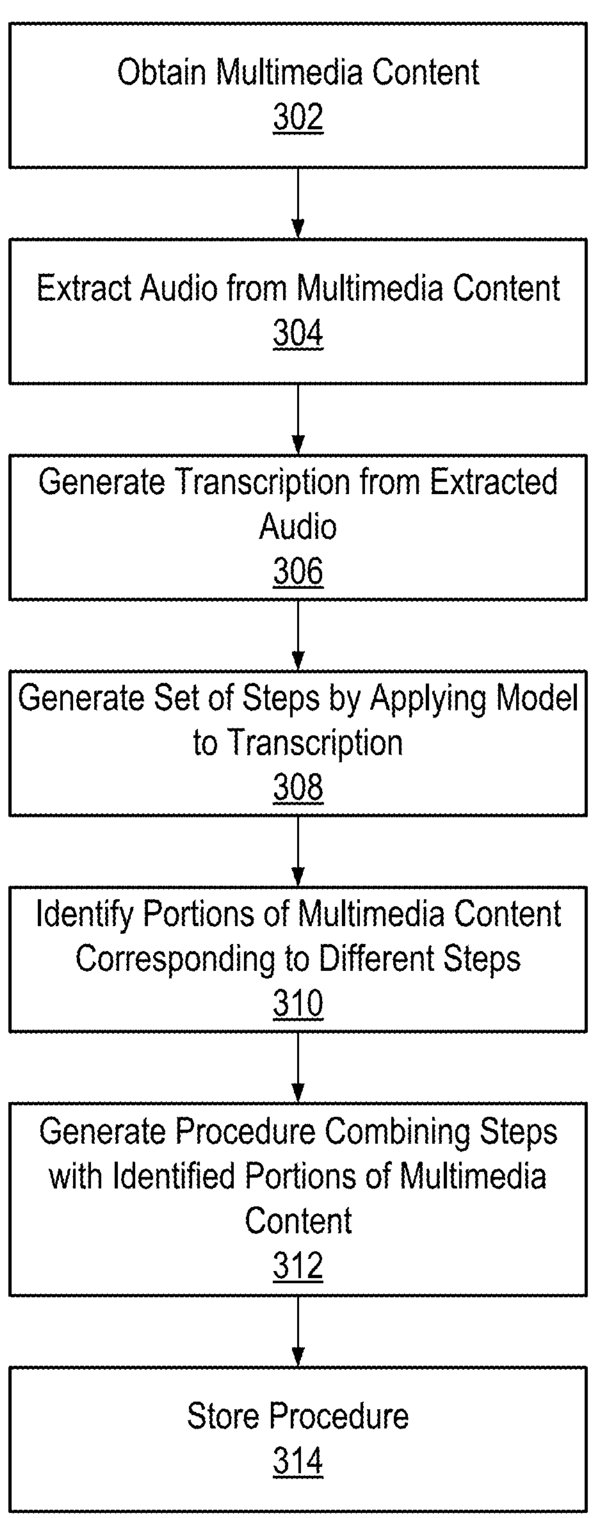
FIG. 3 is a flowchart of an example process for automatically generating a structured multimedia procedure based on input multimedia content.

FIG. 3 is a flowchart of an example process for automatically generating a structured procedure based on input multimedia content. The procedure generation system 140 obtains 302 multimedia content of a procedure. For example, the procedure generation system 140 receives multimedia content from a client device 110 of the procedure being performed. As another example, the procedure generation system 140 receives an identifier of multimedia content from a client device 110 and retrieves the multimedia content from a local data store (e.g., the procedure store 212) or from a third-party system 130.

The procedure generation module 140 extracts 304 audio data from the multimedia content. For example, the procedure generation module 140 applies one or more audio extraction models to the multimedia content to extract audio data from the multimedia content. Based on the extracted audio, the procedure generation module 140 generates 306 a transcription. As further described above, the transcription includes text corresponding to the audio data and timing information for different portions of the text. For example, the transcription includes text generated from the audio data and timestamps for different portions of the text (e.g., individual words, phrases, sentences, paragraphs, etc.). In some embodiments, the procedure generation module 140 generates 306 the transcription, while in other embodiments, a third-party system 130 generates 306 the transcription based on a request from the procedure generation system 140, and the procedure generation system 140 receives the transcription.

Based on the transcription, a set of steps are generated 308 by applying a trained model to the transcription. In some embodiments, the procedure generation module 140 generates 308 the set of steps from the transcription through application of the trained model. Alternatively, the procedure generation module 140 receives the set of steps from a third-party system 130 that generated 308 the set of steps in response to a request from the procedure generation module 140. The set of steps has a temporal order based on the timestamps included in the transcription, so the set of steps provides an ordered sequence, with different steps corresponding to different time intervals. In various embodiments, earlier steps in the set correspond to actions or interactions performed before later steps in the set.

The procedure generation system 140 identifies 310 various portions of the multimedia content based on the set of steps. In various embodiments, the procedure generation system 140 temporally synchronizes the multimedia content and the set of steps when identifying 310 portions of the multimedia content. For a step, the procedure generation module 140 identifies 310 a portion of the multimedia content occurring during a time interval corresponding to the step. For example, the procedure generation module 140 extracts a portion of the multimedia content occurring between a starting timestamp of a step and an ending timestamp of the step. Hence, an identified portion of the multimedia content is a clip of the multimedia content relevant to the step. The procedure generation system 140 generates 312 a procedure by associating each step of the set with a corresponding identified portion of the multimedia content. This augments the text included in a step with a corresponding portion (e.g., a corresponding clip) of the multimedia content, so the procedure includes both textual and multimedia content for various steps. Subsequently, the procedure generation system 140 stores 314 the procedure for subsequent retrieval. For example, the procedure generation system 140 stores 314 the procedure in a procedure store 212 along with metadata. Subsequently, the procedure generation system 140 retrieves the procedure in response to a request from a client device 110 and transmits the procedure to the client device 110 for presentation to a user.

In various embodiments, the procedure generation system 140 may receive inputs from a creating user of the procedure that pin one or more steps of the procedure to locations within an environment map of a local area where the procedure is performed. The environment map comprises a three-dimensional representation of the local area that includes spatial relationships between objects or other entities in the local area. In response to the inputs from the creating user, the procedure generation system 140 generates virtual objects for the environment map that each correspond to different steps. As further described above, when data from a client device 110 indicates the client device 110 is within a threshold distance in the local area from a point in the environment map where a step is pinned, the client device 110 displays one or more virtual objects corresponding to the step. For example, the client device 110 displays content from a step to the user when the client device 110 has a position in the local area within a threshold distance of a point in the environment map where the step is pinned or when an image capture device of the client device 110 includes a location in the local area corresponding to a point in the environment map where the step is pinned.

Figure 4:
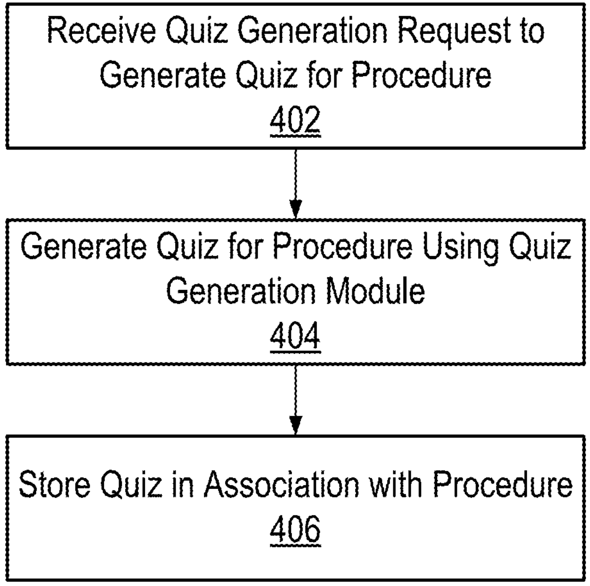
FIG. 4 is a flowchart of an example process for automatically generating a quiz from a structured multimedia procedure.

FIG. 4 is a flowchart of an example process for automatically generating a quiz from a structured multimedia procedure. In various embodiments, the procedure generation system 140 receives 402 a quiz generation request to generate a quiz for a procedure stored by the procedure generation system 140. In various embodiments, the quiz generation request includes an identifier of the procedure and an instruction to generate the quiz for the procedure. Alternatively, the procedure generation system 140 automatically begins the process for generating the quiz.

The procedure generation system 140 generates 404 the quiz for the procedure identified by the quiz generation request, or otherwise identified. In various embodiments, the procedure generation system 140 applies a trained quiz generation model to the identified procedure. For example, the trained quiz generation model is a trained generative model, such as a LLM, that receives a prompt including one or more formatting instructions and the identified procedure. The trained quiz generation model generates one or more questions based on the content of the identified procedure (e.g., text included in steps of the identified procedure, portions of multimedia content associated with steps of the identified procedure, etc.). The one or more questions comprise the quiz for the procedure, and the procedure generation system 140 stores 406 the quiz in association with the identified procedure. Subsequently, the procedure generation system 140 may retrieve the quiz and transmit the quiz to a client device 110 for presentation to a user, with answers to the questions in the quiz indicating the user's understanding of the procedure.

Figure 5:
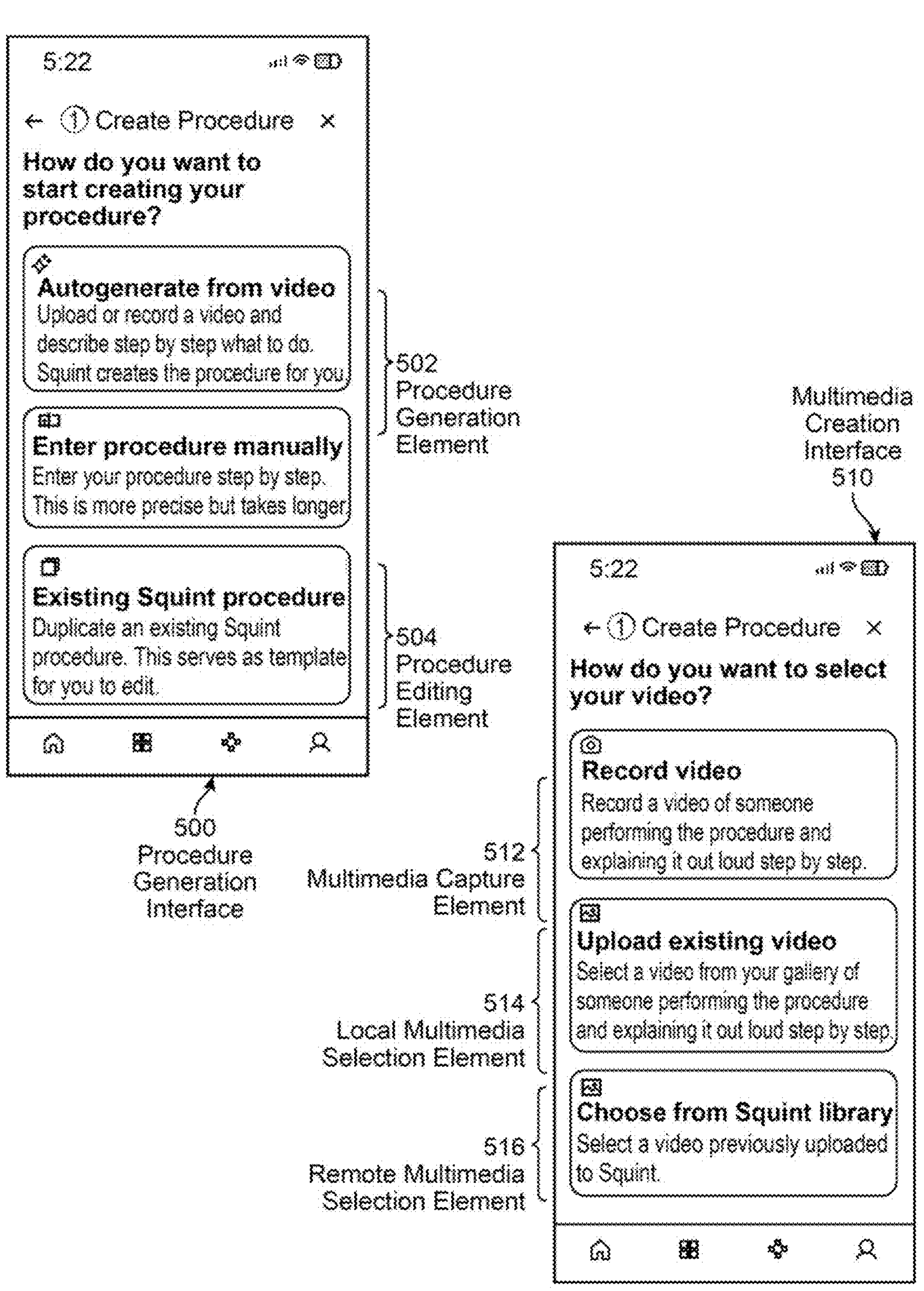
FIG. 5 shows examples of a procedure generation interface and a multimedia creation interface presented by a client device to a creating user for generating a procedure.

FIG. 5 shows an example procedure generation interface 500 and an example multimedia creation interface 510 presented by a client device 110 to a creating user for generating a procedure. For purposes of illustration, FIG. 5 shows a procedure generation interface 500 and a multimedia creation interface 510. The procedure generation interface 500 includes a procedure generation element 502. A creating user selects the procedure generation element 502 to generate a new procedure based on multimedia content for a task. In some embodiments, the procedure generation element 502 is a virtual button with which the creating user interacts. In response to the creating user selecting the procedure generation element 502 by performing a specific interaction with the procedure generation element 502, the multimedia creation interface 510 is displayed to the creating user. The procedure generation interface 500 also includes a procedure editing element 504 that, when selected by a creating user (or other user authorized to modify a procedure), prompt the creating user to identify a previously generated procedure stored by the procedure generation system 140 to be modified (e.g., to which one or more additional steps are added).

Figure 6:
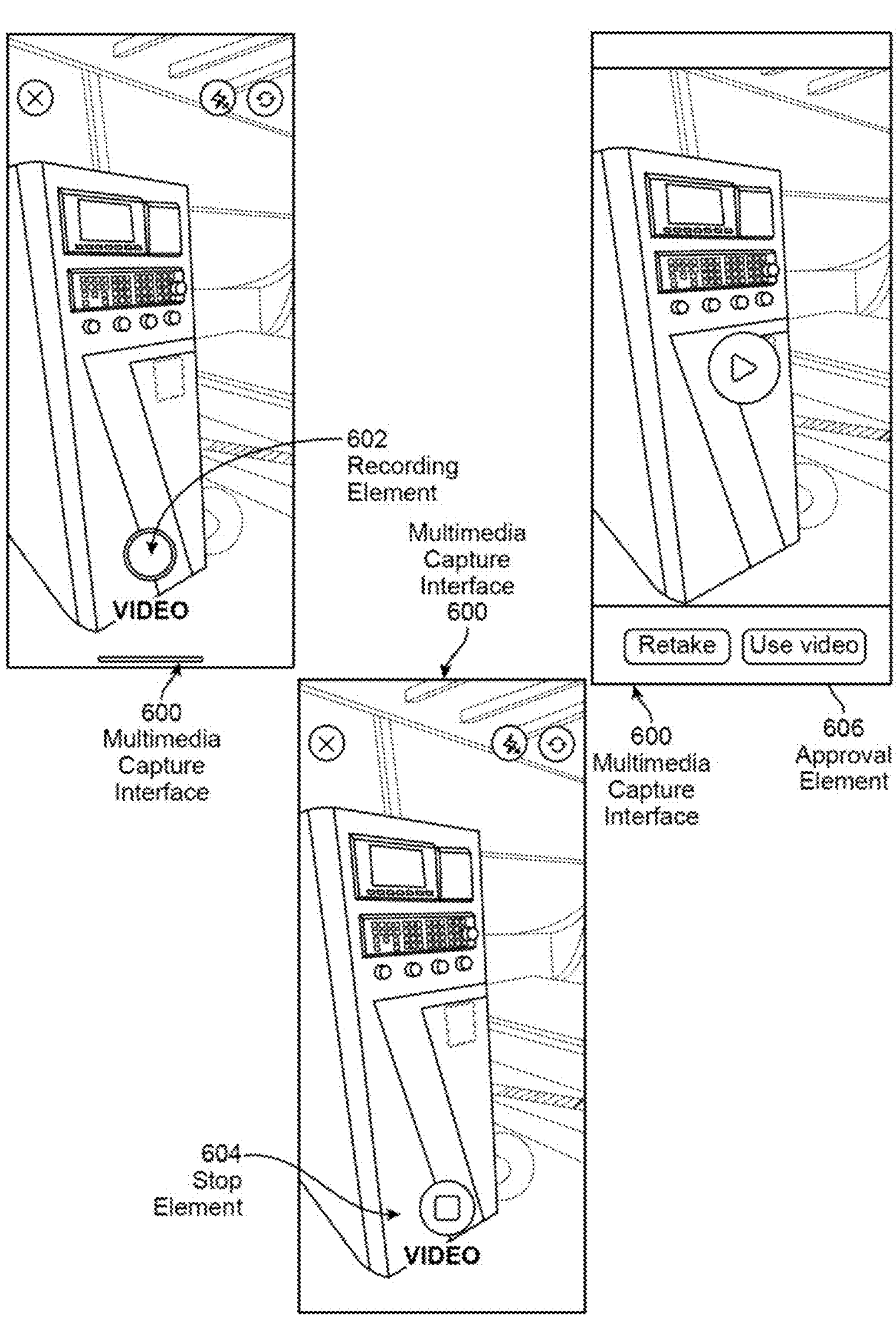
FIG. 6 shows an example multimedia capture interface presented to a creating user for a procedure via a client device.

The multimedia creation interface 510 presents a multimedia capture element 512, a local multimedia selection element 514, and a remote multimedia selection element 516. In response to the creating user selecting the multimedia capture element 512, one or more multimedia capture interfaces, further described below in conjunction with FIG. 6, are presented to the creating user. The multimedia capture interfaces provide instructions or commands to the creating user for capturing multimedia content via a client device 110, such as the client device presenting the multimedia creation interface 510. In response to the creating user selecting the local multimedia selection element 514, one or more selection interfaces are presented to the creating user via the client device 110 that identify multimedia content locally stored by the client device 110. A selection interface includes identifying information for various multimedia content stored by the client device 110. Similarly, in response to the creating user selecting the remote multimedia selection element 516, the client device 110 presents one or more selection interfaces identifying multimedia content stored by the procedure generation system 140 or by a third-party system 130. Via a selection interface, the creating user selects multimedia content stored by the procedure generation system 140 or by the third-party system 130. Hence, selecting the multimedia capture element 512 allows the creating user to capture multimedia content for generating a procedure via the client device 110, while selecting the local multimedia selection element 514 or the remote multimedia selection element 516 allows the creating user to identify previously stored multimedia content for generating the procedure.

FIG. 6 depicts an example multimedia capture interface 600 presented to a creating user for a procedure via a client device 110. As further described above in conjunction with FIG. 5, the multimedia capture interface 600 is presented to the creating user in response to the creating user selecting the multimedia capture element 512 in the multimedia creation interface 510. However, in other embodiments, the multimedia capture interface 600 is presented to the creating user in response to one or more other interactions or inputs from the creating user.

The multimedia capture interface 600 presents a real-time view of a local area surrounding the client device 110 presenting the multimedia capture interface 600. In various embodiments, the real-time view includes video of the local area within a field of view of a camera or an image capture device included in the client device 110. As another example, the real-time view includes video of the local area within a field of view of a camera or an image capture device coupled to the client device 110. Initially, the multimedia capture interface 600 presents a recording element 602 in conjunction with the real-time view of the local area. In the example of FIG. 6, the recording element 602 is overlaid on the real-time view of the local area, but in other embodiments the recording element 602 is displayed proximate to the real-time view of the local area.

In response to receiving a selection of the recording element 602 by the creating user, the client device 110 begins recording video of the local area and capturing audio from the local area for storage and subsequent retrieval. For example, in response to the creating user performing a specific interaction with the recording element 602, the client device 110 begins recording video and audio captured by the camera or image capture device and by one or more microphones or other audio capture devices, respectively. While the client device 110 is recording the captured video and audio, the multimedia capture interface 600 presents a stop element 604 to the creating user in conjunction with the real-time view of the local area. In the example of FIG. 6, the multimedia capture interface 600 is updated to display the stop element 604 in place of the recording element 602 when recording video or audio. However, in other embodiments, the stop element 604 may be displayed in conjunction with the recording element 602. In response to receiving a selection of the stop element 604, such as the creating user performing a specific interaction with the stop element 604, the client device stops recording the video captured by the camera or image capture device, or stops recording audio data captured by one or more microphones or audio capture devices. Hence, the recording element 602 and the stop element 604 allow the creating user to identify times when video or audio of the local area is being recorded and stored by the client device 110.

In response to receiving a selection of the stop element 604 while the client device 110 is recording video data, the multimedia capture interface 600 is modified to display an approval element 606. One or more editing elements may be displayed in conjunction with the approval element 606 in various embodiments. For example, an editing element causes rotation of the recorded video in response to being selected, while other editing elements perform different modifications to the recorded video in response to being selected in various embodiments. Different editing elements may be displayed in different embodiments to simplify modification of recorded video or audio. In response to receiving a selection of the approval element 606 from the creating user (e.g., the creating user performing a specific interaction with the approval element 606), the client device 110 transmits the recorded video and audio of the local area to the procedure generation module 140. For example, the client device 110 transmits a file comprising the recorded video and audio to the procedure generation system 140 in response to receiving the selection of the approval element 606. The creating user may select the approval element 606 after selecting one or more editing elements, allowing the creating user to modify one or more characteristics of the recorded video or audio and transmit the modified recorded video or audio to the procedure generation system 140. In various embodiments, the client device 110 also locally stores the recorded video and audio, such as in a non-volatile storage device, in response to the creating user selecting the approval element 606. Alternatively, the client device 110 locally stores the recorded video and audio, while transmitting the recorded audio and video to the procedure generation system 140 in response to receiving one or more subsequent interactions with the recorded audio and video after local storage.

Figure 7:
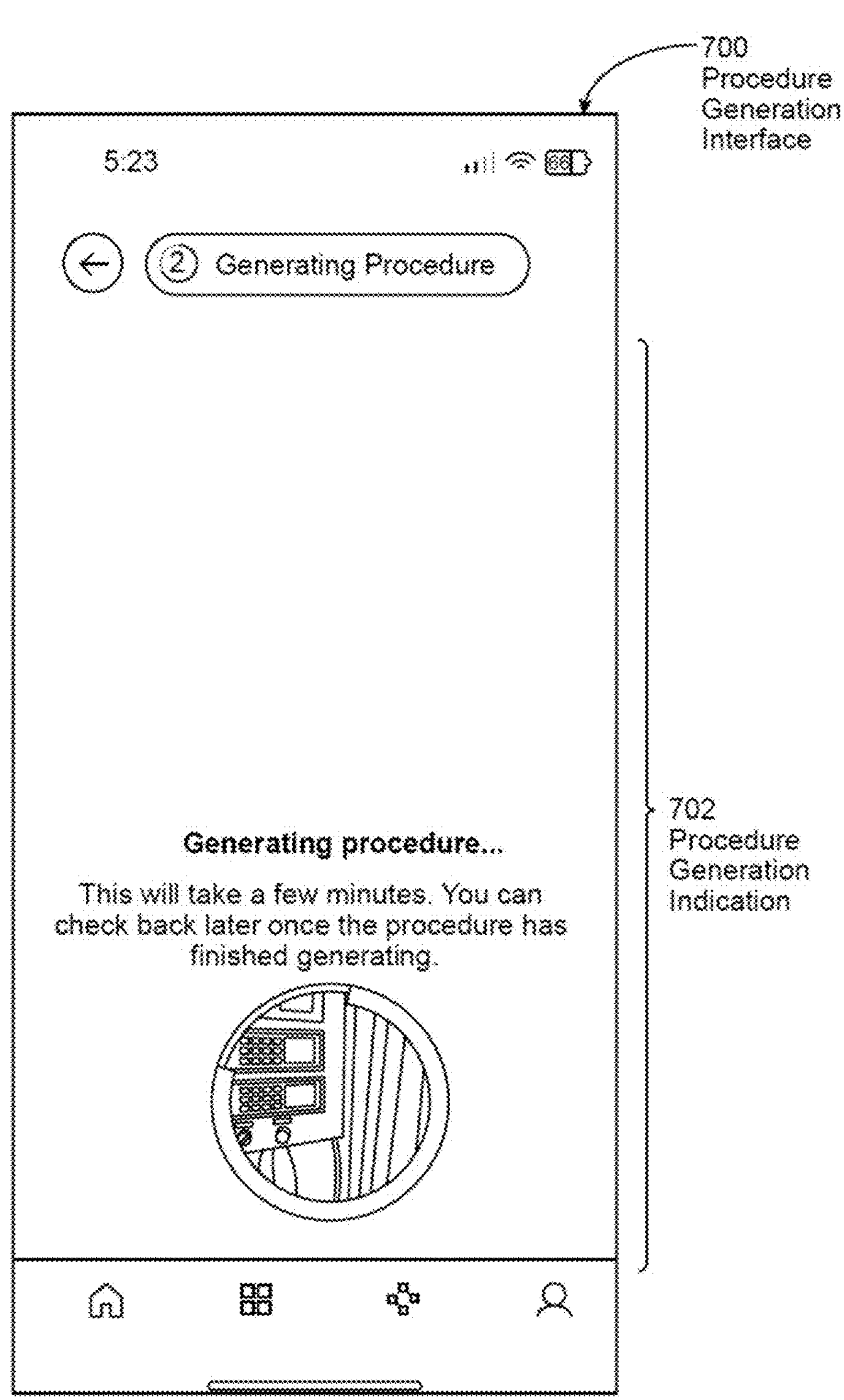
FIG. 7 shows an example procedure generation interface displayed by a client device while a procedure generation system generates a procedure.

FIG. 7 is an example procedure generation interface 700 displayed by a client device 110 while the procedure generation system 140 generates a procedure. In various embodiments, the client device 110 displays the procedure generation interface 700 in response to receiving a selection of the approval element 606 in the multimedia capture interface 600. The procedure generation interface 700 presents a procedure generation indication 702 to the creating user, with the procedure generation indication 702 notifying the creating user that the procedure generation system 140 is generating the procedure from the recorded multimedia content. In various embodiments, the procedure generation interface 700 displays the procedure generation indication 702 until the client device 110 receives the procedure from the procedure generation system 140. In some embodiments, the procedure generation interface 700 presents an indication that the multimedia content from the client device 110 or from a third-party system 130 is being transmitted to the procedure generation system 140. The indication may be a separate interface, or an element displayed by the procedure generation interface 700. For example, the indication comprises an indication of a percentage of the multimedia content that the procedure generation system 140 has received and stored. The indication may be presented for a limited time, such as until the procedure generation system 140 completely receives the multimedia content.

Figure 8:
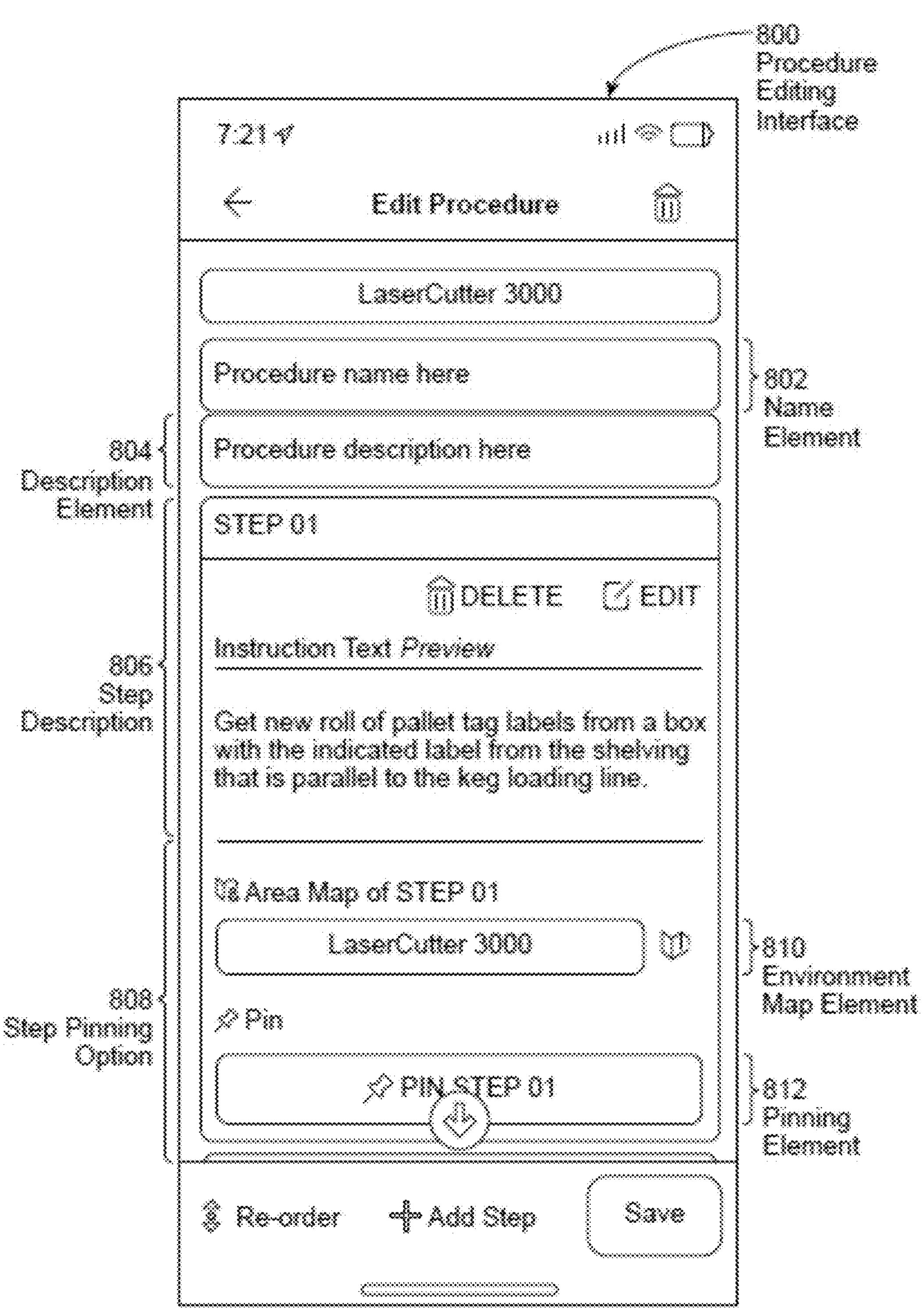
FIG. 8 shows an example procedure editing interface presenting portions of a procedure generated by the procedure generation system to the creating user.

When the procedure generation system 140 completes generating the procedure from the multimedia content received from the client device 110, the procedure generation system 140 transmits the procedures to the client device 110. In response to receiving the procedures, the client device 110 presents a procedure editing interface 800 to the creating user in various embodiments. FIG. 8 shows an example procedure editing interface 800. In the example of FIG. 8, the procedure editing interface 800 includes a name element 802 and a description element 804. While FIG. 8 shows the name element 802 and the description element 804 as initially blank, in some embodiments, the procedure generation system 140 generates a default name of the procedure when generating the procedure and generates a default description of the procedure, as further described above in conjunction with FIG. 2. In such embodiments, the name element 802 initially displays the default name generated by the procedure generation system 140 and the default description generated by the procedure generation system 140. The creating user may specify a name of the procedure or modify a name of the procedure through interaction with the name element 802. Similarly, the creating user may specify a description of the procedure or modify a description of the procedure through interaction with the description element 804 in various embodiments. Data entered to the name element 802 or to the description element 804 is transmitted to the procedure generation system 140 for storage in association with the procedure.

The procedure editing interface 800 also presents a step description 806. In the example shown by FIG. 8, the step description 806 includes text data for a step included in the procedure. However, in other embodiments, the step description 806 includes additional information for a step included in the procedure, such as a thumbnail image representing image data or video data included in the step along with the text data. The step description 806 allows the creating user to review the content generated for a step by the procedure generation system 140. While FIG. 8 shows an example where the step description 806 includes text for a single step of the procedure, in other embodiments, the step description 806 may include portions of text for multiple steps.

Additionally, the procedure editing interface 800 includes a step pinning option 808 that allows the creating user to pin a virtual object corresponding to a step displayed in the step description 806 to a point in an augmented reality (AR) representation of a local area where the task is performed. The step pinning option 808 includes an environment map element 810 and a pinning element 812. Selecting the environment map element 810 presents an AR representation of the local area to the creating user via the client device 110. The pinning element 812 presents an interface through which the creating user identifies a point in the environment map for the step displayed in the step description 806 when selected. For example, the creating user selects the pinning element 812, causing presentation of an interface displaying video captured by a camera or an image capture device of the client device. The creating user performs a specific interaction with the interface displaying the captured video (e.g., selects an interface element, performs a specific gesture) to pin the step displayed in the step description 806 to a point in the environment map corresponding to the location in the local area of the client device 110. As another example, the creating user manually selects or identifies a point by interacting with the displayed environment map to associate the step displayed in the step description 806 with the identified point. After receiving a selection of the point in the environment map, the client device 110 displays the procedure editing interface 800, the client device 110 generates an association between the step presented in the step description 806 and the selected point in the environment map and transmits the association between the step and the selected point in the environment map to the procedure generation system 140. The association between the step and the selected point in the environment map causes a virtual object corresponding to the step to be displayed via a client device 110 when the client device 110 is proximate to a location in the local area corresponding to the selected point in the environment map.

Through interaction with the step description 806, the creating user may modify the step presented in the step description 806. For example, a specific interaction or a specific gesture with the step description 806 causes the step description 806 to display a subsequent step or an earlier step than the step currently being displayed. As another example, the creating user identifies a specific step in the procedure through one or more inputs, and the step description 806 subsequently presents information describing the specific step. This allows the creating user to review various steps of the procedure generated by the procedure generation system 140 via the procedure editing interface 800.

Figure 9:
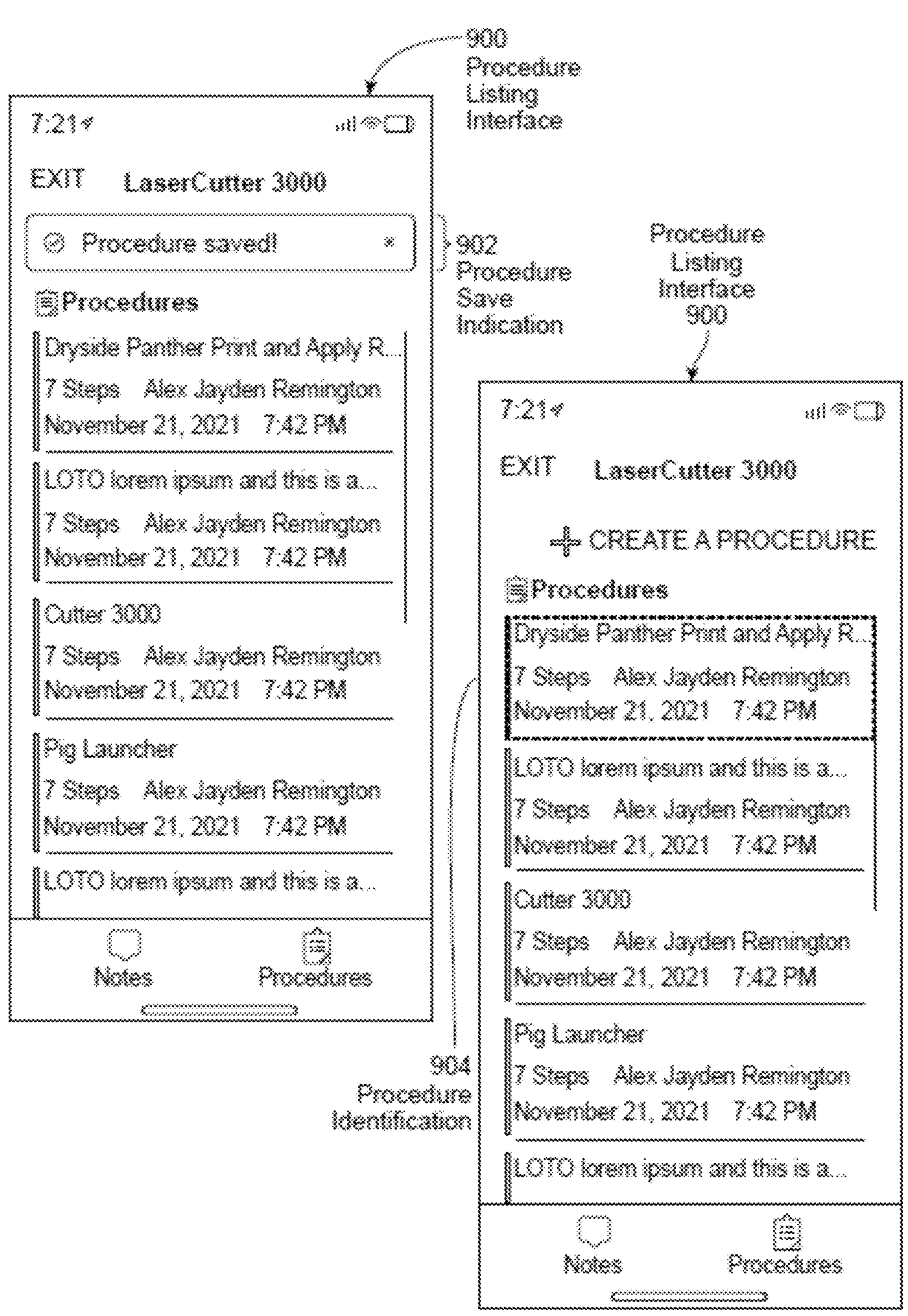
FIG. 9 shows an example procedure listing interface presented to a creating user via a client device identifying procedures generated by the procedure generation system.

FIG. 9 shows an example procedure listing interface 900 presented to a creating user via a client device 110. In various embodiments, the procedure listing interface 900 is presented to the creating user after the creating user selects a specific element in the procedure editing interface 800. For example, the procedure listing interface 900 is displayed in response to the creating user selecting a save element or an authorization element included in the procedure editing interface 800. The procedure listing interface 900 presents descriptive information of various procedures maintained by a procedure generation system 140. In some embodiments, the procedure listing interface 900 displays a title and descriptive information for different procedures maintained by the procedure generation system 140. The procedure listing interface 900 may display descriptive information for a subset of procedures stored by the procedure generation system 140. For example, the procedure listing interface 900 displays descriptive information for procedures associated with a particular organization, such as an organization associated with the creating user.

The procedure listing interface 900 presents a procedure save indication 902 when presented after selection of the specific element in the procedure editing interface 800. The procedure save indication 902 identifies to the creating user that the procedure generated by the procedure generation system 140 has been stored by the procedure generation system 140. In various embodiments, the procedure save indication 902 is presented for a specific time interval, such as for a specific number of seconds when the procedure listing interface 900 is presented after the procedure has initially been stored by the procedure generation system 140. Additionally, the procedure listing interface 900 presents a procedure identification 904 that includes descriptive information about the procedure identified by the procedure editing interface 800. In some embodiments, the procedure identification 904 is visually differentiated from identifying information for other procedures presented in the procedure listing interface 900. For example, the procedure listing interface 900 visually differentiates the procedure identification 904 from identifying information for other procedures for a specific time interval after the procedure generation system 140 generates the procedure. The procedure listing interface 900 may be displayed to other users to allow the other users to identify procedures stored by the procedure generation system 140 and to select a procedure for presentation.

The figures and the description relate to embodiments by way of illustration only. Alternative embodiments of the structures and the methods disclosed herein will be readily recognized as viable alternatives that may be employed without departing from the principles of the embodiments.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These operations, while described functionally, computationally, or logically, are understood to be implemented by computer programs or equivalent electrical circuits, microcode, or the like. Furthermore, it has also proven convenient at times to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. Embodiments may also relate to an apparatus for performing the operations herein. This apparatus may be specially constructed for the required purposes, and/or it may include a general-purpose computing device selectively activated or reconfigured by a computer program stored in the computer. Such a computer program may be stored in a tangible non-transitory computer readable storage medium or any type of media suitable for storing electronic instructions and coupled to a computer system bus. Furthermore, any computing systems referred to in the specification may include a single processor or may include architectures employing multiple processor designs for increased computing capability.

Upon reading this disclosure, those of skill in the art will still appreciate additional alternative structural and functional designs for the disclosed embodiments from the principles herein. Thus, while particular embodiments and applications have been illustrated and described, the disclosed embodiments are not limited to the precise construction and components disclosed herein. Various modifications, changes, and variations, which will be apparent to those skilled in the art, may be made in the arrangement, operation, and details of the disclosed embodiments herein without departing from the scope.

Finally, the language used in the specification has been principally selected for readability and instructional purposes, and it may not have been selected to delineate or circumscribe the inventive subject matter. It is therefore intended that the scope is not limited by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A method for generating a procedure describing performance of a task, the method comprising:

obtaining multimedia content of performance of the task, the multimedia content including video data and audio data comprising a description of performance of the task;

extracting the audio data from the multimedia content;

generating a transcription of the audio data, the transcription including text corresponding to portions of the audio data and timestamps associated with various text;

generating a set of steps from the transcription of the audio data by applying a trained model to the transcription, each step including a portion of the audio data corresponding to a time interval based on the timestamps;

identifying portions of the video data corresponding to different steps of the set from the multimedia content, an identified portion of the video data for a step including multimedia content occurring during the time interval corresponding to the step;

generating the procedure by associating one or more steps of the set with a corresponding identified portion of the video data for the one or more steps;

receiving, via a client device, an identification of a step of the procedure and an identification of a physical location in a local area, the physical location being associated with the step based on the identification of the step and the identification of the physical location, wherein the physical location is identified through an augmented reality interface of the client device that presents a view of the local area captured by a camera of the client device;

generating a virtual object associated with the physical location and the step; and storing the procedure in a procedure store for subsequent retrieval such that the virtual object is automatically displayed during the subsequent retrieval based on a viewing device being in proximity to the physical location associated with the step, wherein the viewing device displays information corresponding to the step responsive to interaction with the virtual object via the viewing device.

2. The method of claim 1, wherein generating the set of steps from the transcription of the audio data by applying the trained model to the transcription comprises:

generating a prompt for a trained generative model that includes one or more formatting instructions and that includes the transcription having the text and timestamps corresponding to various text; and applying the trained generative model to the prompt to generate the set of steps from the transcription based on the one or more instructions in the prompt.

3. The method of claim 1, wherein a formatting instruction identifies one or more selected from a group consisting of: a language for the steps, characteristics of text to remove from the transcription when generating a step, how to combine text in the step, timing information to include in the step, and any combination thereof.

4. The method of claim 1, wherein timestamps associated with various text comprise a timestamp associated with each individual word in the text.

5. The method of claim 1, wherein timestamps associated with various text comprise a timestamp associated with different groups of words in the text.

6. The method of claim 1, further comprising:

receiving a quiz generation request identifying the procedure;

generating a quiz comprising one or more questions about the procedure by applying a trained quiz generation model to the procedure; and storing the quiz in the procedure store in association with the procedure.

7. The method of claim 1, wherein obtaining multimedia content of performance of the task comprises:

receiving multimedia content of the local area where the task is performed from the client device that captured the multimedia content during performance of the task.

8. The method of claim 1, wherein obtaining multimedia content of performance of the task comprises:

receiving an identifier of the multimedia content from the client device; and retrieving stored multimedia content associated with the identifier.

9. The method of claim 1, wherein generating the procedure by associating one or more steps of the set with the corresponding identified portion of the video data for the one or more steps comprises:

storing an association between a point in an environment map of the local area in which the task is performed and a step in response to receiving information from a creating user via the client device identifying the physical location in the local area corresponding to the point.

10. A non-transitory computer-readable storage medium storing instructions for generating a procedure describing performance of a task, the instructions when executed by one or more processors causing the one or more processors to perform steps comprising:

obtaining multimedia content of performance of the task, the multimedia content including video data and audio data comprising a description of performance of the task;

extracting the audio data from the multimedia content;

generating a transcription of the audio data, the transcription including text corresponding to portions of the audio data and timestamps associated with various text;

generating a set of steps from the transcription of the audio data by applying a trained model to the transcription, each step including a portion of the audio data corresponding to a time interval based on the timestamps;

identifying portions of the video data corresponding to different steps of the set from the multimedia content, an identified portion of the video data for a step including multimedia content occurring during the time interval corresponding to the step;

generating the procedure by associating one or more steps of the set with a corresponding identified portion of the video data for the one or more steps;

receiving, via a client device, an identification of a step of the procedure and an identification of a physical location in a local area, the physical location being associated with the step based on the identification of the step and the identification of the physical location, wherein the physical location is identified through an augmented reality interface of the client device that presents a view of the local area captured by a camera of the client device;

generating a virtual object associated with the physical location and the step; and storing the procedure in a procedure store for subsequent retrieval such that the virtual object is automatically displayed during the subsequent retrieval based on a viewing device being in proximity to the physical location associated with the step, wherein the viewing device displays information corresponding to the step responsive to interaction with the virtual object via the viewing device.

11. The non-transitory computer-readable storage medium of claim 10, wherein a formatting instruction identifies one or more selected from a group consisting of: a language for the steps, characteristics of text to remove from the transcription when generating a step, how to combine text in the step, timing information to include in the step, and any combination thereof.

12. The non-transitory computer-readable storage medium of claim 10, wherein timestamps associated with various text comprise a timestamp associated with each individual word in the text.

13. The non-transitory computer-readable storage medium of claim 10, further storing instructions that, when executed by the one or more processors causing the one or more processors to perform steps comprising:

generating a quiz comprising one or more questions about the procedure by applying a trained quiz generation model to the procedure; and storing the quiz in the procedure store in association with the procedure.

14. The non-transitory computer-readable storage medium of claim 10, wherein obtaining multimedia content of performance of the task comprises:

receiving multimedia content of the local area where the task is performed from the client device that captured the multimedia content during performance of the task.

15. The non-transitory computer-readable storage medium of claim 10, wherein generating the procedure by associating one or more steps of the set with the corresponding identified portion of the video data for the one or more steps comprises:

storing an association between a point in an environment map of the local area in which the task is performed and a step in response to receiving information from a creating user via the client device identifying the physical location in the local area corresponding to the point.

16. A computer system comprising:

one or more processors; and a non-transitory computer-readable storage medium storing instructions for generating a procedure describing performance of a task, the instructions when executed by the one or more processors causing the one or more processors to perform steps comprising:

obtaining multimedia content of performance of the task, the multimedia content including video data and audio data comprising a description of performance of the task;

extracting the audio data from the multimedia content;

generating a transcription of the audio data, the transcription including text corresponding to portions of the audio data and timestamps associated with various text;

generating a set of steps from the transcription of the audio data by applying a trained model to the transcription, each step including a portion of the audio data corresponding to a time interval based on the timestamps;

identifying portions of the video data corresponding to different steps of the set from the multimedia content, an identified portion of the video data for a step including multimedia content occurring during the time interval corresponding to the step;

generating the procedure by associating one or more steps of the set with a corresponding identified portion of the video data for the one or more steps;

receiving, via a client device, an identification of a step of the procedure and an identification of a physical location in a local area, the physical location being associated with the step based on the identification of the step and the identification of the physical location, wherein the physical location is identified through an augmented reality interface of the client device that presents a view of the local area captured by a camera of the client device;

generating a virtual object associated with the physical location and the step; and storing the procedure in a procedure store for subsequent retrieval such that the virtual object is automatically displayed during the subsequent retrieval based on a viewing device being in proximity to the physical location associated with the step, wherein the viewing device displays information corresponding to the step responsive to interaction with the virtual object via the viewing device.

17. The computer system of claim 16, wherein a formatting instruction identifies one or more selected from a group consisting of: a language for the steps, characteristics of text to remove from the transcription when generating a step, how to combine text in the step, timing information to include in the step, and any combination thereof.

18. The computer system of claim 16, wherein timestamps associated with various text comprise a timestamp associated with each individual word in the text.

19. The computer system of claim 16, further storing instructions that, when executed by the one or more processors causing the one or more processors to perform steps comprising:

generating a quiz comprising one or more questions about the procedure by applying a trained quiz generation model to the procedure; and storing the quiz in the procedure store in association with the procedure.

20. The computer system of claim 16, wherein obtaining multimedia content of performance of the task comprises:

receiving multimedia content of the local area where the task is performed from the client device that captured the multimedia content during performance of the task.

* * * * *